June 8, 1965  G. W. WRIGHT ETAL  3,188,005
POWER RESET MECHANISM FOR REGISTERS
Filed July 30, 1962  8 Sheets-Sheet 1

INVENTORS
GEORGE W. WRIGHT,
ELMER A. ROBBINS &
MELVIN C. HANKEL
BY: *Edmund W E Kamm*
ATTORNEY

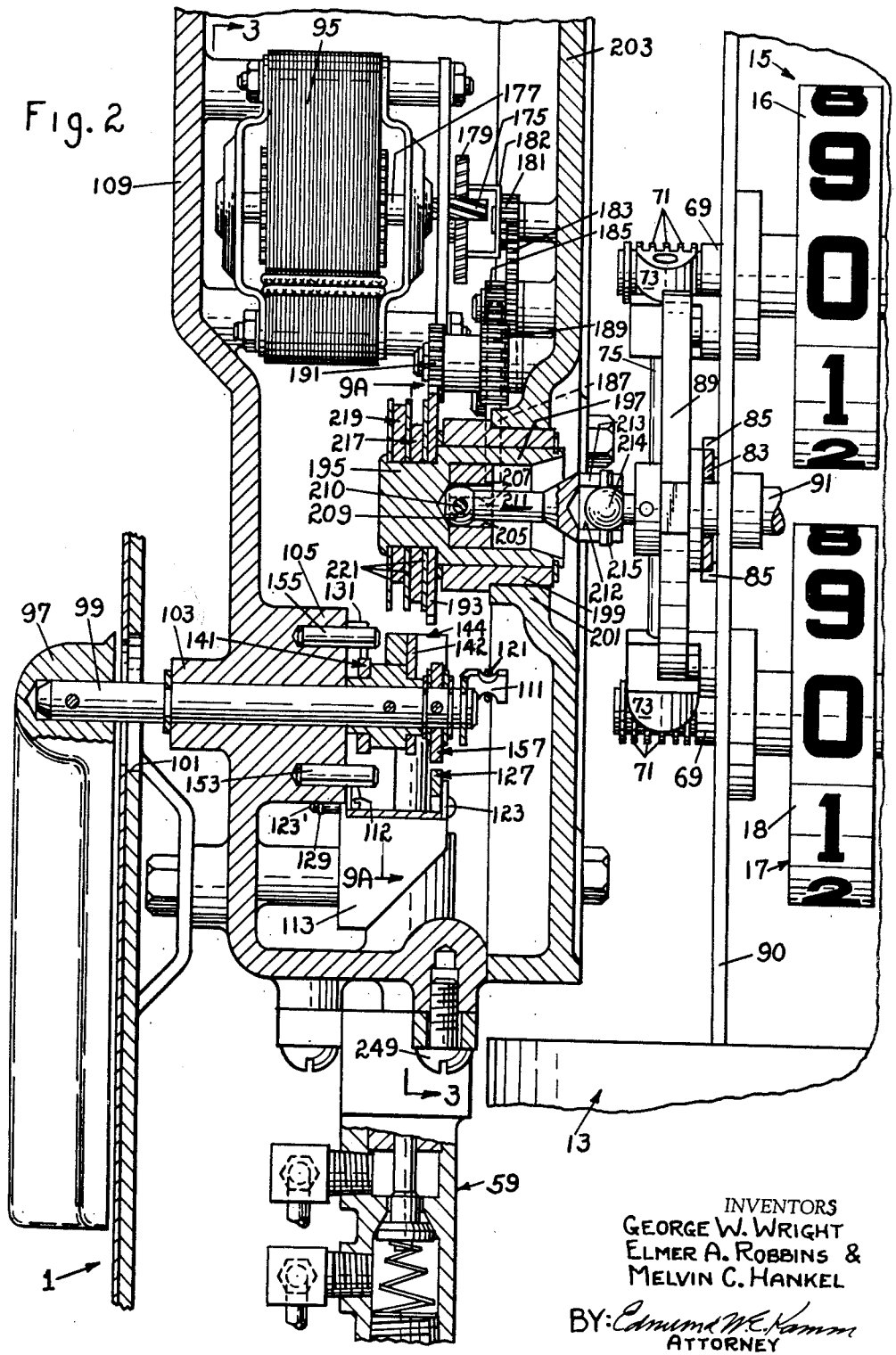

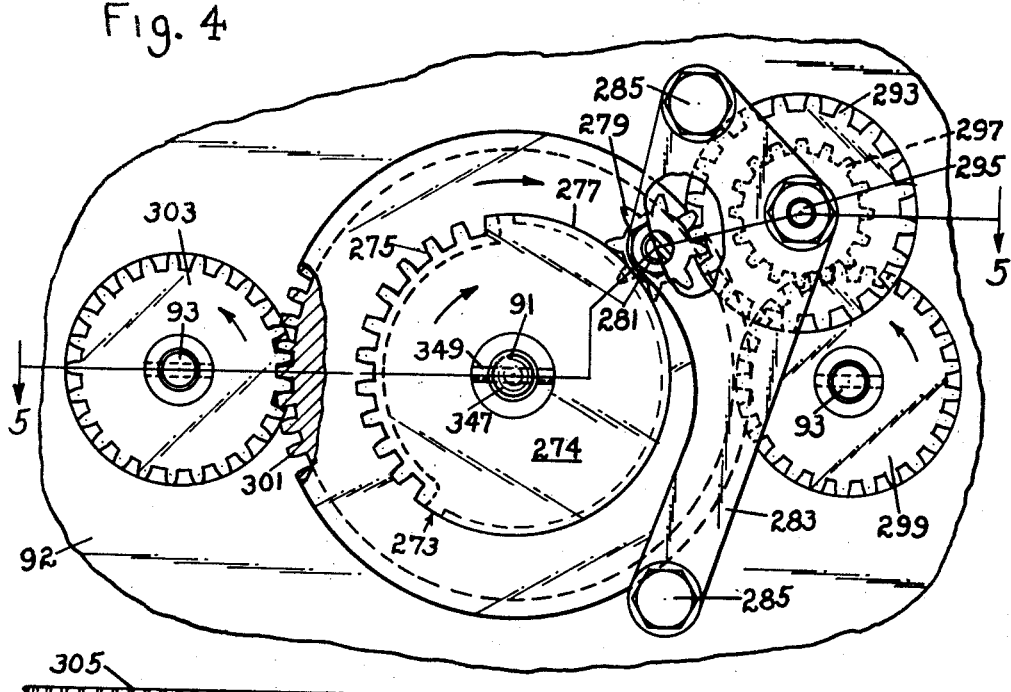
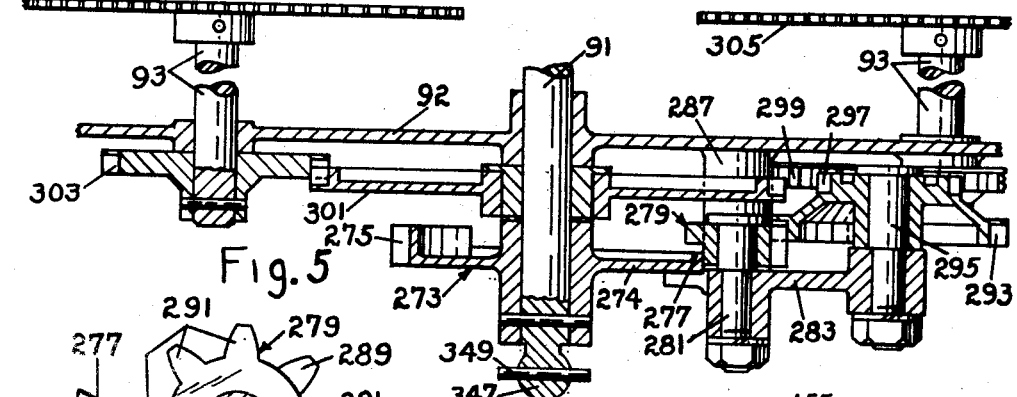
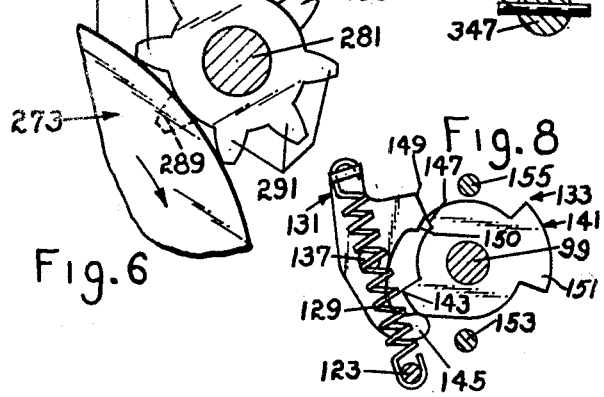

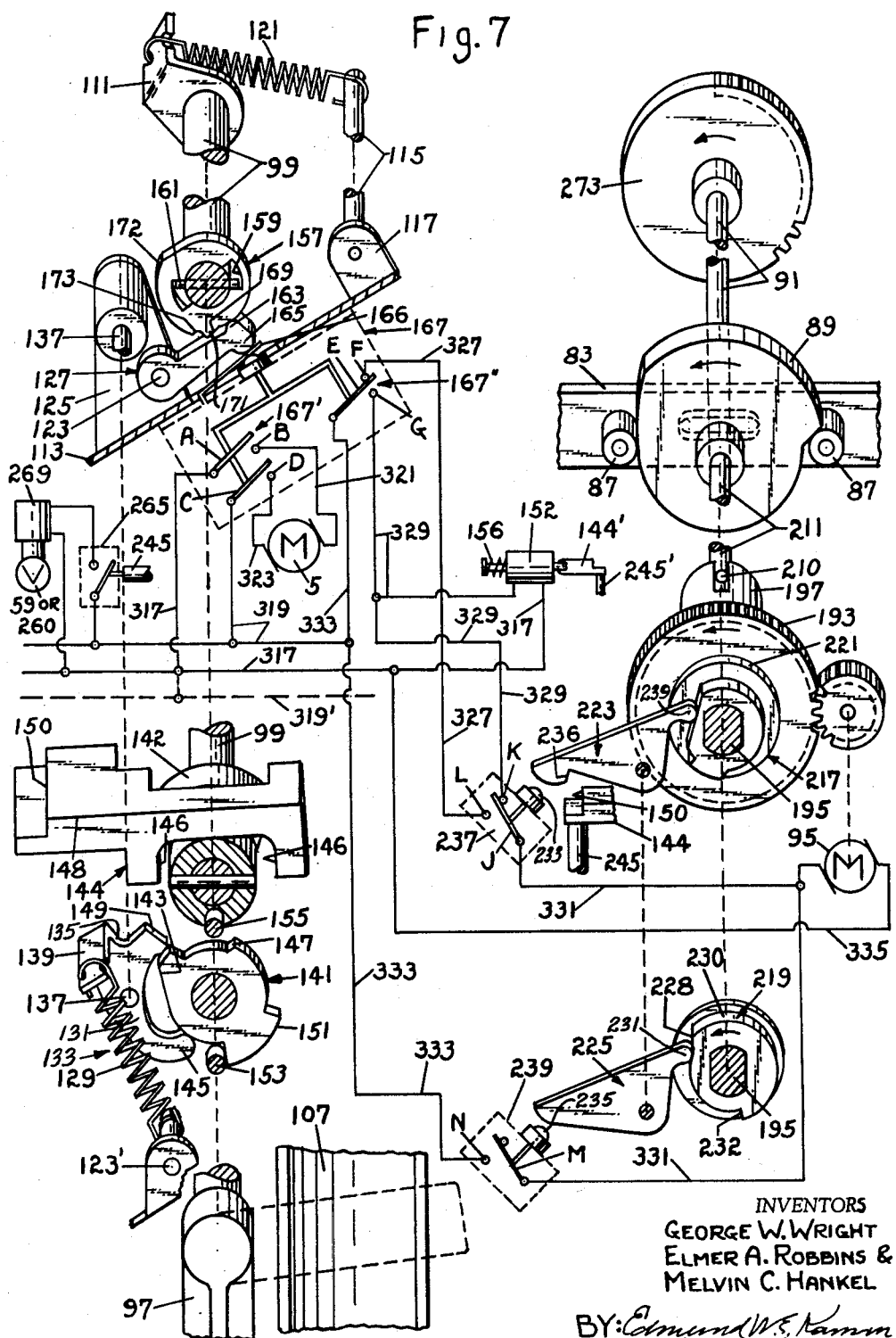

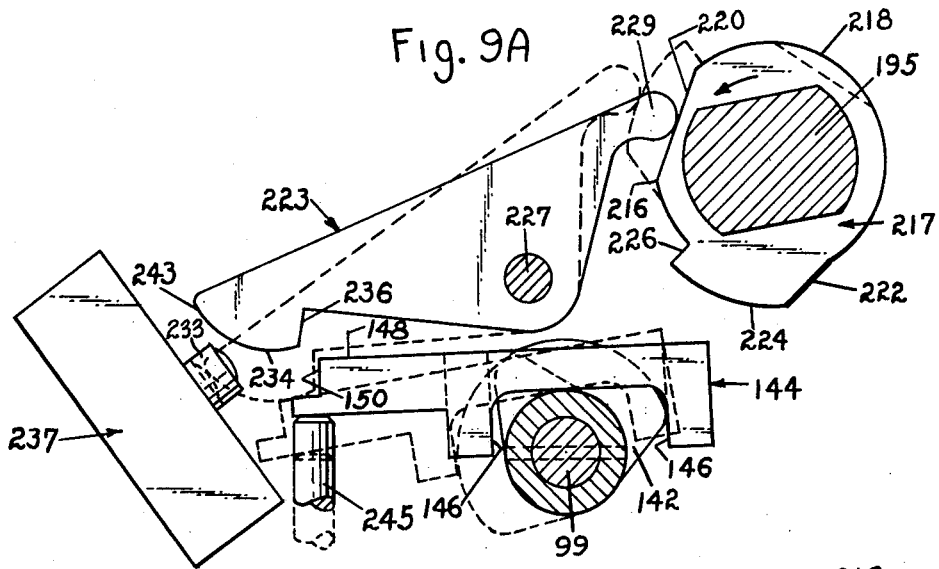
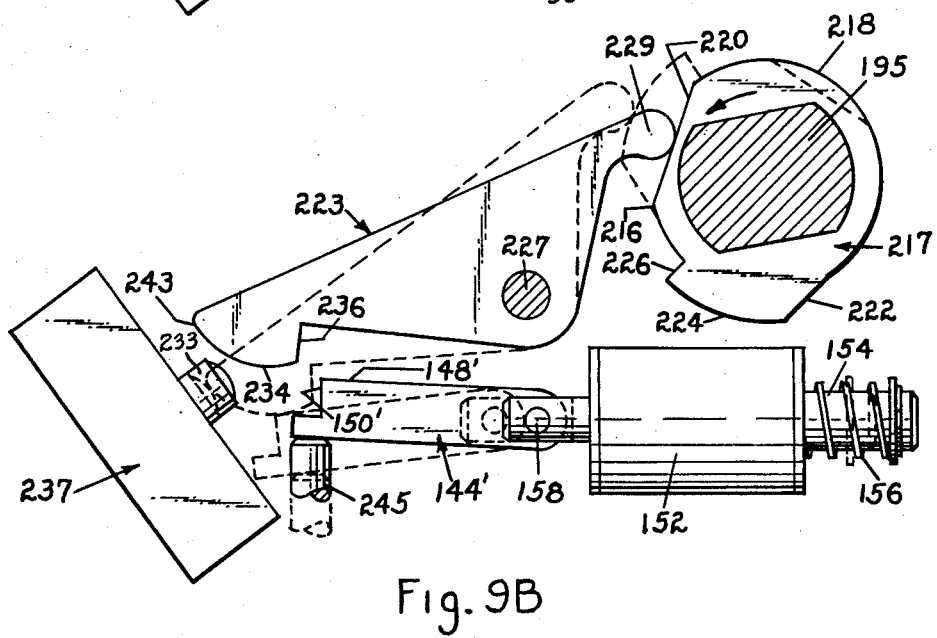

June 8, 1965 G. W. WRIGHT ETAL 3,188,005
POWER RESET MECHANISM FOR REGISTERS
Filed July 30, 1962 8 Sheets-Sheet 7
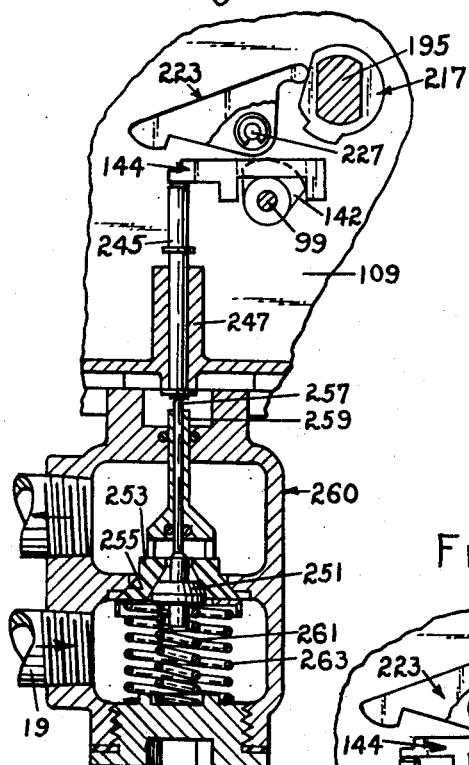
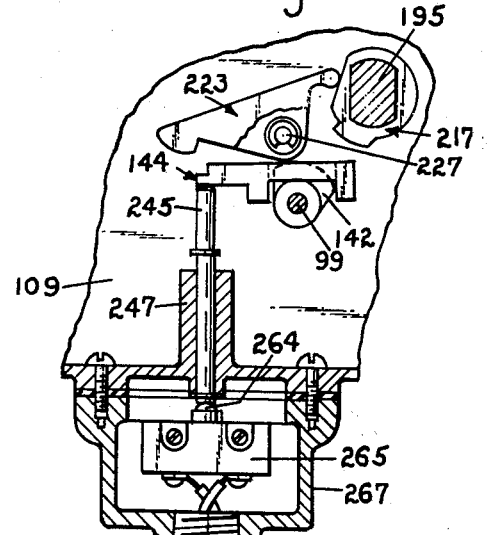
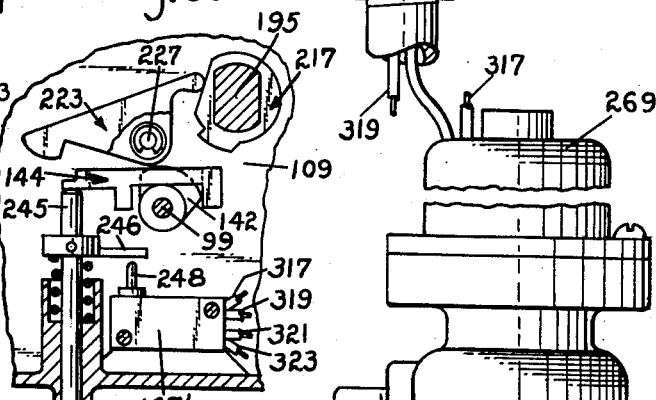
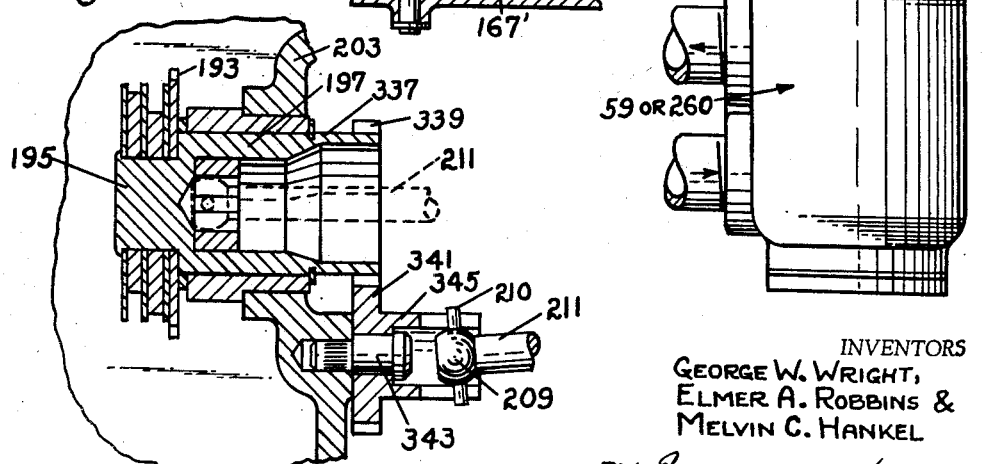
INVENTORS
GEORGE W. WRIGHT,
ELMER A. ROBBINS &
MELVIN C. HANKEL
BY: *Edmund W. E. Kamm*
ATTORNEY

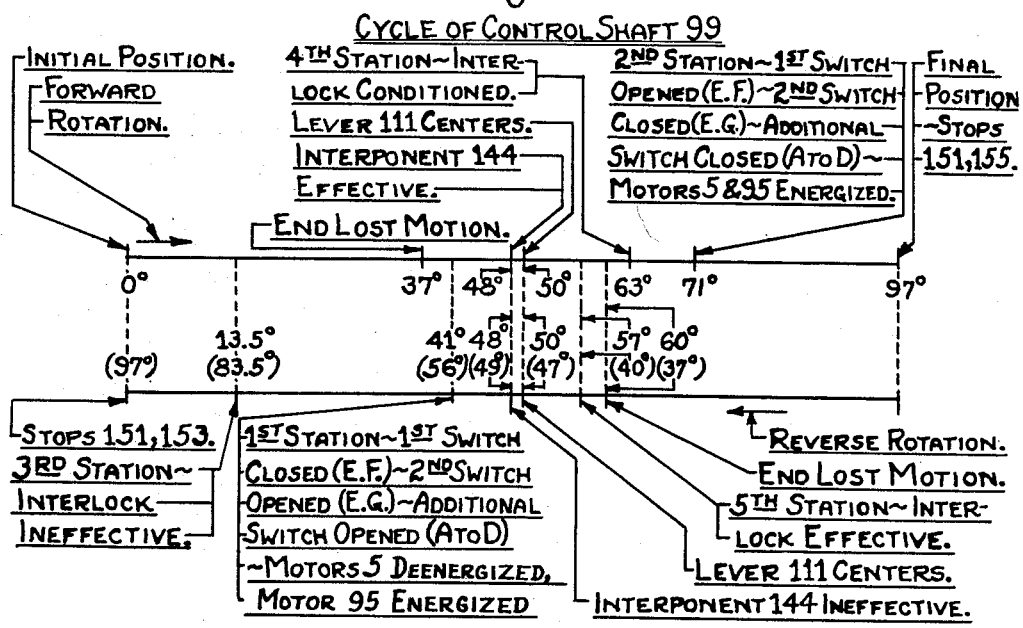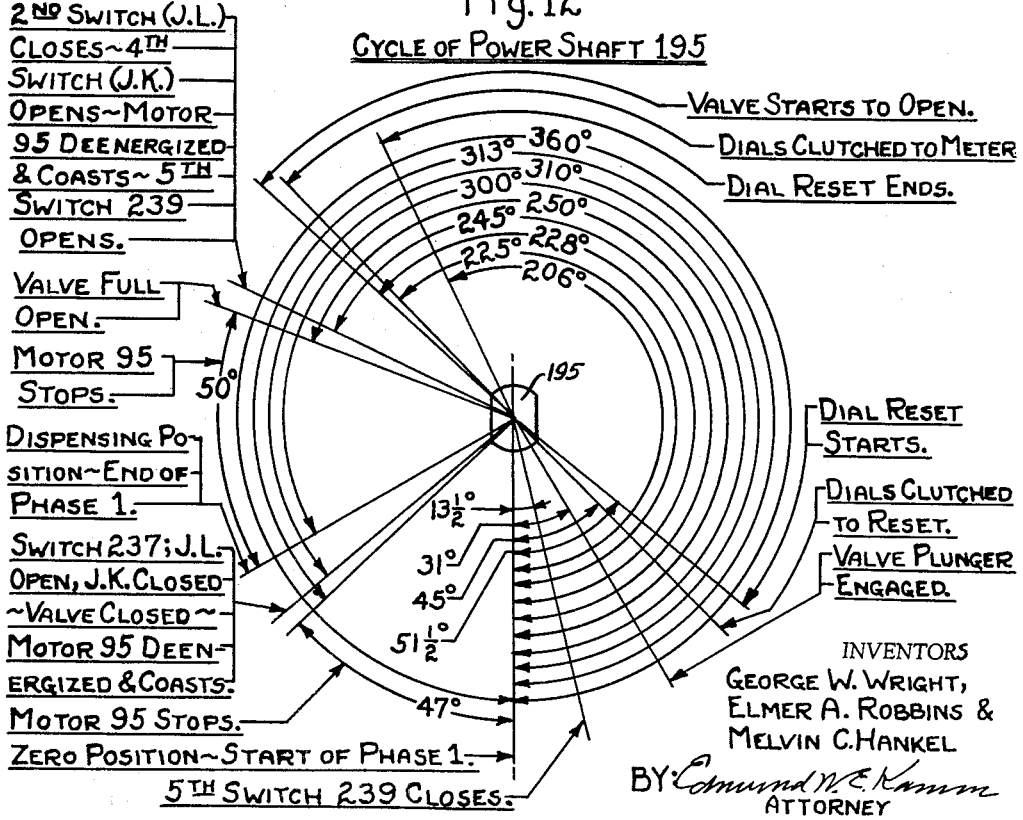

United States Patent Office 3,188,005
Patented June 8, 1965

3,188,005
POWER RESET MECHANISM FOR REGISTERS
George W. Wright, Yoder, and Elmer A. Robbins and Melvin C. Hankel, Fort Wayne, Ind., assignors to Tokheim Corporation, Fort Wayne, Ind., a corporation of Indiana
Filed July 30, 1962, Ser. No. 213,499
45 Claims. (Cl. 235—144)

This invention relates to a power reset mechanism for registers. More specifically, it relates to power means for resetting the registers of a fuel dispenser, for starting the dispensing motor and/or for opening the control valve in the fuel delivery line in a predetermined sequence so as to prevent the delivery of fuel until the resetting of the registers to zero has been completed.

Another object of the invention is to insure the proper execution of the above cycle regardless of the manner in which the manually operated lever, used to initiate the resetting and delivery cycle, is operated.

A further object of the invention is to provide a structure which will control the speed at which the various functions are performed so that the registering mechanism and other devices will operate properly.

Still another object of the invention is to minimize the amount of manual force required to cause the operation of the mechanism and thereby to discourage the application of undue force.

A further object is to prevent excessive force from being transmitted to vital elements of the mechanism.

Yet another object of the invention is to provide means for insuring that the registers will come to rest in their zero positions each time they are reset.

A further object is to provide a mechanism which operates automatically through one phase of a cycle to effect certain events and through a second phase to effect other events, in response to manually operable means which operate to start each phase of the cycle.

These and other objects will become apparent from the study of this specification and the drawings which are attached hereto, made a part hereof and in which:

FIGURE 2 is a partial section taken substantially on line 2—2 of FIGURE 3, showing the registering and resetting mechanisms.

FIGURE 4 is an elevation, viewed from the right of FIGURE 1 showing the means for driving and locking the resetting mechanism.

FIGURE 5 is a sectional view taken substantially on the line 5—5 of FIGURE 4.

FIGURE 6 is a detailed view of the locking disk and pinion of FIGURES 4 and 5.

FIGURE 7 is an expanded view of the control and power mechanisms and the wiring diagram.

FIGURE 8 shows the interlock latch pawl conditioned for becoming effective.

FIGURE 9 shows the pawl in its effective position.

FIGURE 9A is a view taken on line 9A—9A of FIGURE 2 showing one form of interponent mechanism.

FIGURE 9B shows a modified form of interponent mechanism.

FIGURE 10 shows alternative means for operating the pump switch.

FIGURE 11 is a displacement and event diagram for the control shaft.

FIGURE 12 is a displacement and event diagram for the power shaft during a complete cycle.

FIGURE 14 is an alternate construction showing a double poppet dispensing control valve.

FIGURE 15 is another alternate construction showing a solenoid operated dispensing control valve.

FIGURE 16 is a modified construction of the connection between the resetting motor and the power shaft.

Figure 1:
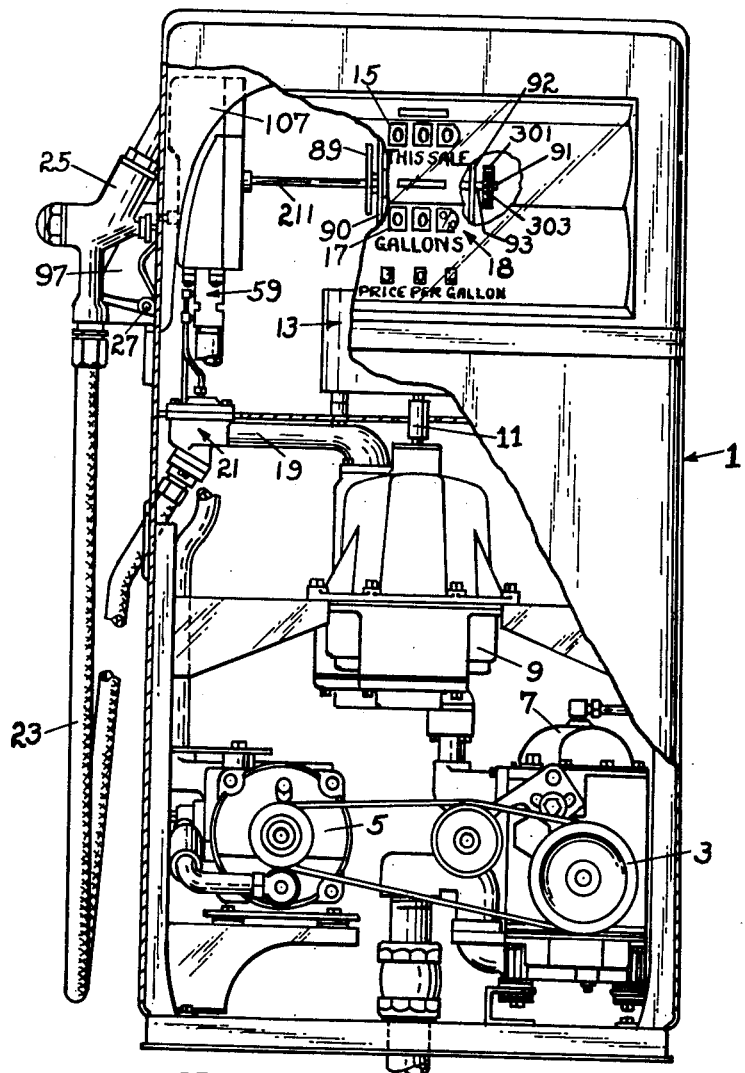
FIGURE 1 is a front elevation of a fuel dispenses, with parts broken away, to show interior components.

Referring first to FIGURE 1, numeral 1 indicates a motor pump dispenser in which 3 is the pump, 5 the motor for driving the pump, 7 the air separator, 9 the meter which measures the air free liquid discharged by the separator.

The meter drives a shaft 11 which drives a speed or cost variator 13. The variator has a gallons shaft (not shown) which is connected to drive two gallons registers 17, located on opposite faces of the registering mechanism 18, and a second shaft (not shown) connected to drive the cost registers 15 in an advancing direction as the meter operates, so that the cost and quantity of the liquid delivered will be shown on the registers 15 and 17 respectively.

A dispensing line 19, flow control valve 21, hose 23 and valved nozzle 25 are connected with the meter to dispense the liquid measured thereby.

A fixed nozzle support 27 is mounted on the dispenser which extends through a slot in the nozzle guard and blocks the valve trigger in the usual manner.

The flow control valve 21 (FIG. 13) comprises a body 29 having an inlet 31 and an outlet 33 communicating with line 19 and hose 23 respectively, and with each other through a port 35 which is controlled by poppet valve 37 mounted on a diaphragm 39. The body 29 and its cap 41 form with the diaphragm, inlet and control chambers 43, 45 which communicate by way of an orifice 47 in the diaphragm. A spring 49 urges the valve 37 closed.

The outlet 33 and the control chamber 45 are connected by tubes 51 and 53 to the outlet and inlet chambers 55, 57 of a pilot valve body 59. The chambers communicate through a port 61 which is controlled by a poppet 63 which moves to close with the flow from chamber 57 to 55 and is urged closed by a spring 65. The stem 67 of the valve projects out of the body for actuation as will be described below.

The control valve operates to close the port 35 whenever the pilot valve 63 is closed. However, when the pilot valve and the nozzle valve are both open, liquid will flow from chamber 45, through 53, 57, 61, 55, 51, 33, 23 and 25 more rapidly than it can enter 45 through orifice 47. Consequently, a differential pressure will be imposed on diaphragm 39 which will open valve 31 against spring 49. The degree of opening of the valve will be governed to a large extent by the degree of opening of the nozzle valve which regulates the pressure in outlet 33 and therefore the pressure in chamber 45.

For a more complete description of this type of valve, reference is made to U.S. Patents No. 2,732,100 and 2,-732,103 issued January 24, 1956.

Referring now to the mechanism for driving and resetting the registers 15 and 17, the basic structure of the registers is shown in U.S. Patent 2,814,444 issued November 26, 1957, and only so much of this structure as is required for an understanding of the herein disclosed invention will be described.

Figure 3:
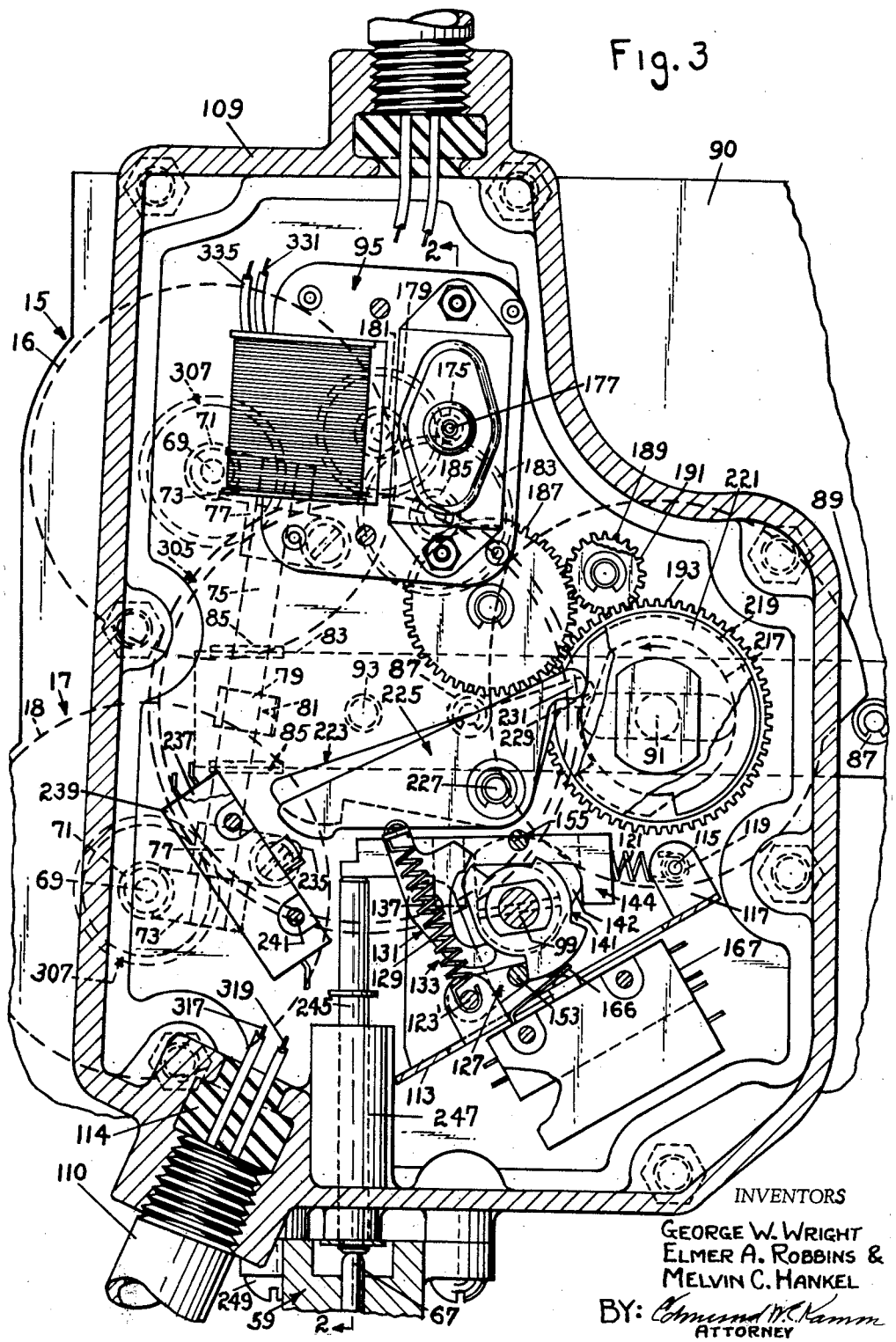
FIGURE 3 is a sectional view of the power reset mechanism taken substantially on line 3—3 of FIGURE 2.

As seen in FIGURE 3 one cost and one gallons register 15, 17 are shown on the left. A second pair of registers are provided on the right of this view but are not shown in this view but appear in FIGURE 2.

Each register is provided with a central clutch shifting shaft 69 which is axially movable and which is formed with circular rack teeth 71 on the one end (FIG. 2). The teeth of each rack are meshed with teeth formed on a corresponding shifting gear sector 73. The sectors for the two registers shown in FIG. 3 are fixed to a shaft 75 which is journalled in bearings 77 and which has a lever 79 which enters an opening 81 in a shifting bar 83 mounted to reciprocate endwise between guides 85. Rollers 87 mounted on the bar are engageable by a shifting cam 89 which is fixed to the power shaft 91 which is journalled in side frames 90 and 92 as described in detail below.

It will be seen that when cam 89 (FIG. 3) rotates counterclockwise from the position shown, it will shift bar 83 left. The right hand edge of opening 81 will act on lever 79 so as to rotate shaft 75 and sectors 73 counterclockwise when viewed from the top and these will therefore move the clutch shafts 69 to the left (FIG. 2).

The shaft corresponding to 75 (not shown) for the registers on the right hand side will be similarly rotated but since the sectors thereof are to the left (FIG. 3) of the corresponding clutch shafts 69, these shafts will be moved to the right (FIG. 2) which is opposite to those shown. This is obviously necessary since the registers on the right side of FIG. 3 are reversed, end for end, with respect to those shown in FIG. 3.

It is sufficient at present to state that the described motions of the shafts 69 in response to the rotation of the cam 89, declutch the drive between the cost and gallons shafts of the variator and the individual registers 15, 17 respectively and clutch the registers to the resetting shafts 93 (FIGURES 3, 4 and 5), which, when operated as described below, reset all of the register dials to zero. Upon further rotation of said cam to a different position, it will shift bar 83 to the right (FIG. 3) to restore shafts 69 and the clutches to their initial positions so that the registers will again be advanced when the meter is operated to dispense liquid.

The operation of the valves 63 and 21, the bar 83 and the pump motor 5 is accomplished by a resetting motor 95 and the mechanisms which will now be described. The timing of the various events of the cycle of shaft 91 will be set out in detail. The motor 95 is of a common variety and includes a brake (not shown) which brakes the motor when the latter is deenergized.

As will be seen from FIGS. 1, 2 and 7, a control lever 97 is mounted on a control shaft 99 which extends from the exterior of the dispenser through an opening 101 in the housing thereof and is journalled in bosses 103, 105 which are integral with an explosion proof control box 109, 203 in which the motor 95 and other devices are contained. It is seen that if the lever 97 is rotated counterclockwise when viewed from the left in FIGURES 1 and 2, and from the bottom of FIG. 7, it will overlie the entrance to the nozzle boot 107. Thus the lever cannot be turned as stated while the nozzle is in the boot and on its support 27 and the nozzle cannot be inserted in the boot and hung on its support while the lever is across or even part way across the boot opening.

As seen in FIGURES 2, 3 and 7, control shaft 99 has mounted on its inner end a lever 111. A bracket 113 is fixedly mounted on the box by screws 112 (FIG. 2) and an anchor stud 115 (FIG. 3) extends from an ear 117 on the bracket and is grooved at 119 to receive one end of spring 121, the other end of which is hooked on the lever 111. The lever extends generally away from both the stud 115 and shaft 99 so that as the shaft is rocked, the spring will pass the center of the shaft and will thus complete the rotation of shaft 99 in either direction over this center.

A second stud 123 is mounted in another ear 125 of the bracket 113 to serve as a pivot for the switch operating lever 127 and as an anchor for the overcentering spring 129 for the three armed lever 131 of the interlock mechanism indicated generally by 133.

The lever 131 is pivotally mounted on a stud 137 as shown in FIGS. 3 and 7, which is fixed in the wall of the box and one arm 135 extends away from both studs 123' and 137 and has a laterally bent ear 139 to which the other end of spring 129 is hooked. Thus as the lever is rocked from the FIG. 3 to the FIG. 8 position or reversely, the spring 129 passes to the opposite side of the stud 137 and this spring acts to complete the movement of the pawl in either direction. It is noted that studs 123 and 137 are parallel to but are spaced radially from the control shaft 99.

A control cam 141 and an interponent cam 142 are fixed to shaft 99. Cam 141 has a portion 143 which actuates arm 145 of lever 131, a tooth 147 for engaging latch pawl 149 of lever 131 and a stop lug 151, the opposite ends of which co-act with stops 153, 155, fixed in the box, to limit the rotation of shaft 99.

Cam 142 acts on the pads 146 of interponent 144, which rides on the hub of the cam, to move it toward and away from a plunger 245, as lever 97 rotates from and to its initial position respectively.

A motor control cam 157 is loosely mounted on shaft 99. As seen in FIG. 7, the cam has diametrically opposed, circumferentially extending notches communicating with the opening which receives shaft 99. A pin 161 is passed through the shaft and its opposite ends extend into the notches 159. The length of the notches and the pin diameter are preferably such that there will be 37 degrees of lost motion between the cam and the shaft. The specific amount of angular lost motion between the cam and the shaft is stated for purposes of illustration but is not critical and might vary considerably in other embodiments of the invention.

Cam 157 acts on lever 127 which is pivoted on stud 123. This lever has a cam follower projection 163 disposed on the edge of the lever adjacent the cam. A second projection 165 formed on the other edge of the lever engages the actuator 166 of the switch designated generally by 167. This switch is of the "snap action" type which, at some point in the motion of actuator 166, in either direction, moves quickly from one condition to another. Switch 167 is in effect and may actually comprise two snap switches 167', 167" mounted for simultaneous operation by 166.

In the relative positions of the parts shown in FIG. 7, it will be seen that as shaft 99 is rotated counterclockwise, the pin 161 will move in notches 159 until the lost motion is taken up, and will then drive the cam. The lever 127 will be rotated clockwise (FIG. 7) as the rise 169 passes over the follower 163, and before reaching the high point 171, it will cause actuator 166 to throw the switch and the rest portion 172 of the cam will hold the parts in this condition.

Upon clockwise rotation of shaft 99, levers 127 and 166 are held depressed until rise 169 passes projection 163. Premature actuation of lever 127 during such rotation of 99, which might drag the cam with the shaft, is prevented by a notch 173 disposed between the portions 171 and 172 of the cam which would be entered by the follower 163 to hold the cam against rotation by the shaft until the pin 161 engages the ends of the notches 159, whereupon the cam would be positively driven past 163 at the proper time. Dragging of the cam with the shaft during its counterclockwise rotation is limited by engagement of the follower with the rise portion. Thus the switches will operate at the proper times (explained below) despite possible cam drag.

The mechanism for driving the power shaft 91 is shown in FIGS. 2 and 3. The motor 95 has a pinion 175 on its armature shaft 177, which drives gear 179 mounted on the motor frame. Gear 179 is connected by a yoke 182 to drive gear 181. Gear 181 drives gear 183 which is integral with gear 185. The latter drives gear 187 which drives 189. Gear 191, integral with 189, drives gear 193 which is fixed to the hub 195 of a socket member 197. The member 197 is journalled in a bearing 199 fixed in a boss 201 of the cover 203 for box 109. All of the gears mentioned, except the pinion 175 and gear 179 are mounted on the cover.

The member 197 has a bore 205 which has radial slots 207. The ball and pin 209, 210 on one end of shaft 211 are received in the bore and slots. The other end of shaft 211 is enlarged and has a similar bore and slot 212, 213 to receive the ball and pin connections of shaft 91. The length of shaft 211 may be varied which, with the ball and socket connections, permits different relative placements of the box and the registering mechanism.

The hub 195 has fastened to it, adjacent the gear 193, the cams 217, 219. A disc 221 is inserted between and on each side of the cams to serve as flanges for guiding the cam follower levers 223, 225. Referring to FIG. 9A, it is seen that cam 217, which rotates counterclockwise, has a first rise portion 220, a dwell 218, a second rise 222, a dwell 224, an abrupt drop 226 and a further drop 216. Cam 219 has a rise portion 228, a dwell 230 and an abrupt drop 232 back to its initial level.

The levers 223, 225 are pivotally mounted intermediate their ends on a stud 227 mounted on the cover plate and have follower arms 229, 231 which are actuated respectively by the cams 217 and 219. The opposite ends of levers 223, 225 are adapted to depress the actuators 233, 235 of the snap action switches 237, 239 respectively, which are mounted on the box by means of studs 241 (FIG. 3).

The free end 148 of interponent 144 is thick, vertically, (FIGURES 7 and 9A) and has the upper corner notched out at 150. The bottom of 144 rests on top of plunger 245 at all times. When 144 is moved toward 245, the thick end 148 is positioned to be engaged and depressed by a land 234 near the end of lever 223, as 223 rotates to actuate switch 237. Plunger 245 will thus be depressed to actuate a valve and/or switch. Lever 223 is notched adjacent to land 234 to form a hook 236 which enters notch 150 if 144 is moved away from 245 while 223 is in actuated position. The depths of the notches are such that when 148 is withdrawn, plunger 245 will rise far enough to return the valve and switch to initial conditions. While 236 and 150 remain engaged, the part 148 cannot be inserted between 234 and 245 and counterclockwise rotation of shaft 99 is stopped prior to the closure of switches 167', 167".

Plunger 245 is mounted for reciprocation in a boss 247 formed as a part of the box and extends through the box so as to bear on the stem 67 of the pilot valve 59 (FIGURE 2) which is attached to the box by screws 249.

Alternatively, as shown in FIG. 14, a dispensing line valve 260 may be attached to the box instead of valve 59. Valve 260 has a small poppet 251 seated on an annular large poppet 253 which closes on a seat 255 of the valve. The stem 257 of poppet 251 extends through and beyond the end of the hollow stem 259 of the large poppet and both extend into the path of plunger 245 which, when it is depressed, will first open the small poppet to relieve the pressure differential on the large poppet so that it can be readily opened when its stem is depressed by the plunger. In this case, the dispensing line 19 is connected directly to the inlet of this valve and the hose 23 is connected to the outlet. No control valve such as 21 is required. The poppets are urged closed by suitable springs 261, 263.

In a further modification as shown in FIGURE 15, a switch 265 may be fastened to the box 109 by means of a suitable case 267 with its actuator 264 disposed in the path of plunger 245. The switch is connected to control a solenoid 269 which is connected to actuate a valve such as 59 or 260. The armature of the solenoid moves downwardly when the solenoid is energized to open the associated valve in the same manner as the plunger 245. The switch and solenoid are shown in FIG. 7 as they are connected with the main power supply when they are used.

To explain how the individual register dials are reset by shaft 91, reference is had to FIGS. 1, 2 and 4 to 7. It was previously stated that shaft 91 is journalled in the side frames 90, 92 of the registering mechanism and that it extends beyond them. It has also been explained how the motor 95 is connected to the end of shaft 91 which extends through the cam 89. As shown in FIG. 4, the other end of shaft 91 terminates in a ball and pin connector 347, 349 and has pinned to it, adjacent said connector, the hub of a gear 273. The gear comprises a radial flange 274 having a slight axial flange 277 at its periphery. A series of twelve, radial spur gear teeth 275 are formed integrally with flange 274 and extend axially therefrom. Both flanges 274, 277 are interrupted in the region of said teeth.

An eight tooth pinion 279 is rotatably mounted on a stud 281 which is mounted on a bracket 283 supported by screws 285 which enter bosses 287 extending from the side frame 92. As shown in FIGURES 4 and 6, the pinion has two, diametrically opposed teeth 289 which are one half the axial length of the remaining six teeth 291 so that the two long teeth on either side of the short teeth can ride on the flange 277 (FIG. 6) so as to lock the pinion against rotation and the short tooth will project into the path of the leading sector tooth 275, for movement thereby when the latter moves into engagement with it. Since the flange is interrupted in the region of the sector teeth 275, the pinion will perform 1.5 revolutions for each passage of the sector teeth and will be again locked against rotation until the sector teeth again reach the pinion.

All of the pinion teeth mesh in sequence with the sector teeth and with a gear 293 which is rotatably mounted on another stud 295 supported by bracket 283. Gear 297 is integral with gear 293 and drives a gear 299 which is mounted on the one of the reset shafts 93 which is disposed on one side of the registering mechanism. A large idler gear 301 is rotatably mounted on shaft 91, is driven by gear 299 and drives the gear 303 which is fixed on the second and opposite reset shaft 93. As shown in dashed lines in FIG. 3, a large gear 305 is mounted on reset shaft 93 for each dial 16 of the cost register 15 and meshes with a corresponding gear 307 of such dial. The same gears 305 also mesh with similar gears 307 on the dials 18 of the gallons register 17. The dials of the registers displayed on the other face of the registering mechanism are connected by similar gearing to the other reset shaft 93. All of the gears 305, 307 are disposed between the end frames 90, 92.

*Wiring diagram*

Referring to FIG. 7 it will be seen that switch 167 includes, in effect, a double pole, single throw, snap action switch 167' and a single pole, double throw switch 167". Switch 167' comprises pairs of contacts A, B and C, D respectively while 167" comprises a movable contact E which normally engages contact F (1st switch) and, when actuated, engages contact G (3rd switch). When actuator 166 is depressed, by lever 127, a predetermined distance, movable contacts A, C and E will shift rapidly to engage contacts B, D and G respectively, E, F being opened. A reverse snap action occurs when the actuator is released.

Switch 237 is a single pole double throw snap switch having a movable contact J which is held normally engaged with a fixed contact K (4th switch) when its actuator 233 is not depressed and which quickly engages contact L (2nd switch) when its actuator is depressed a predetermined distance by lever 223. Switch 239 (5th switch) is a single pole, single throw snap switch which is normally open when its actuator 235 is not depressed by lever 225 and its movable contact M quickly engages contact N when 235 is depressed a predetermined distance. These switches also return quickly to initial condition when their actuators are withdrawn to a predetermined point.

The power supply mains 317 (neutral), 319 (hot), enter the box through a conduit 110 and seal cavity 114 (FIG.

3) and are connected to contacts A and C respectively of switch 167'. The dispensing pump motor is connected to contacts B and D respectively by lines 321, 323. Contacts F and G of switch 167" are connected by wires 327, 329 to contacts L and K respectively of switch 237, while contact J thereof is connected to contact M of switch 239 and both J and M are connected by 331 to one side of the resetting motor 95. The contact N of switch 239 is connected by 333 to contact E of 167" and to main 319. The other side of the motor 95 is connected by 335 to main 317.

When motor 5 is a 230 volt motor, the wiring is the same as that shown in FIG. 7 except that contact A is connected to the second hot main 319' of the usual three wire circuit, instead of to the neutral wire 317.

*Operation*

Assuming that the dispenser is in an inoperative condition, in which the parts occupy the positions shown in FIGS. 1 to 7, to make a delivery, the nozzle 25 is removed from the support 27 and boot 107 to remove it from the path of lever 97. The lever is then rotated counterclockwise (forward) from the full line position (FIG. 7) toward the dashed line position.

The various events in the cycles of the shafts 99 and 91 occur in the order shown in FIGS. 11 and 12. FIG. 11 represents the forward and reverse strokes of the actuating shaft 99 while FIG. 12 depicts the entire cycle of the power shaft 91.

During the first 37 degrees of forward rotation of the shaft 99, cam 157 does not have any effective movement because of its lost motion connection 159, 161. Lever 111 however stresses spring 121 without passing it over the center of 99, cam 143 advances counterclockwise relative to follower arm 145 and cam 142 moves interponent 144 toward plunger 245. Shaft 91 remains stationary and no significant events occur as the result of this 37 degree movement.

After about an additional 11 degrees movement, to the 48 degree position, the thick part of interponent 144 enters between land 234 of lever 223 and plunger 245. Upon an additional 2 degree rotation of 99 to the 50 degree position, the spring 121 reaches the dead center position, but no other event occurs until the shaft has rotated an additional 13 degrees to the 63 degree position whereupon the rise 143 of cam 141 has rotated lever 131 clockwise far enough to throw spring 129 to the right of pivot 137 as shown in FIG. 9. The tooth 147 of cam 141 has rotated counterclockwise far enough so that the latch pawl 144 rests on the top edge of the tooth and does not drop into locking relation in front of the tooth 147, so that it will not oppose the further rotation of the cam. The inclination is such that, upon further rotation of cam 141, the pawl will not be cammed counterclockwise far enough to reverse the overcentered spring and it will therefore remain spring biased for clockwise rotation.

During the above 13 degree rotation, spring 121 becomes definitely influential and if the handle 97 is released, the shaft 99 will be rotated by this spring to the end of its counterclockwise stroke.

Also cam 157 is advanced but lever 127 and actuator 166 are not depressed far enough to shift switches 167', 167".

During the next 6½ to 9 degrees of travel from the 69.5 to 72 degree positions and preferably at about 71 degrees, cam 157, lever 127 and actuator 166 cause contacts A, B, C, D and E, G to be closed and both motors 5 and 95 will be energized. Spring 121 and lever 111 rotate the shaft 99 and lever 97 to the 97 degree position which is determined by stops 151 and 155.

Motor 5 is energized by circuit A from 317 through A, B, 321, 5, 323, D, C, to 319. Motor 95 is energized by circuit B from 317 through 335, 95, 331, J, K, 329, G, E, 333 to 319. The lever 97 reaches a position across the nozzle boot well before the 71 degree position is reached, so that the nozzle cannot be inserted therein and engaged with its support.

The described starting of the motor 5 does not make it possible to deliver fuel through the nozzle because the control valve 37, or valves 251, 253 if these are used, remain closed.

The starting of motor 95 now will perform certain events of the power shaft cycle which are illustrated in FIG. 12.

Substantially immediately from the start of rotation of shaft 91, the cam 89 (FIG. 3) begins to shift the bar 83 and the clutch shifting shafts 69 in directions to declutch the register dials from the meter driven shafts and toward clutching position with the resetting gears 307 as disclosed in Patent No. 2,814,444. While this event continues and at about 13.5 degrees from initial position of 91, the rise 228 of cam 219 actuates lever 225 far enough to close contacts N, M of switch 239 to establish a holding or anti-fraud *circuit C* for the reset motor 95, from 317 through 335, 95, 331, M, N, 333, to 319. The main function of this circuit is to prevent improper manipulation of shafts 99 or 91 to the end that a delivery could be made without resetting the registers. In effect, the circuit insures that once shaft 91 has rotated to the 13.5 position, the motor 95 will continue to run until at least the first phase of the cycle of shaft 91 is completed, whether or not the contacts AB, CD and EG of 167 are closed or not. This is true since the motor 95 and switch 239 are in series directly across lines 317, 319.

At about 31 degrees from zero, the rise portion 220 of 217 has moved its lever 223 counterclockwise far enough to cause land 234 to engage interponent 144 but not depress it or the plunger 245. At 45 degrees from zero, the clutching of the register dials to the resetting gears 307, and declutching them from the meter driven shafts is completed.

As seen in FIG. 4, the described rotation of shaft 91 has advanced the teeth 275 of sector gear 273 toward the positioned tooth 289 of pinion 279 and contact between them is established when the shaft has rotated substantially 51.5 degrees. The flanges 274, 277 being interrupted, unlock the pinion 278, permit rotation of the pinion through exactly 1.5 revolutions and thereafter relock it. This motion of pinion 279 is transmitted to the resetting gears 307 of all of the dials by the trains previously described above.

This gearing is arranged so that the zero indicia of all of the numeral dials come to their exact zero positions as the transmission of motion from the sector gear to the pinion 279 ceases, and the pinion is relocked, so that the indicator dials cannot move out of zero position. The stopping and locking of the dials occurs when shaft 91 has been displaced about 206 degrees from its zero position.

During the further movement of shaft 91 to its 225 degree position, the cam 89 moves bar 83 and clutch shafts 69 so as to declutch the register dials from the resetting gears 307 and clutch them to the meter driven shafts. Upon further motion of shaft 91 to its 228 degree position the rise portion 222 of cam 217 begins to further depress the plunger 245 and the stem 67 of pilot valve 63 (FIG. 13) or that of the small valve 251 (FIG. 14) which ever is used, and such valve starts to open.

As shaft 91 rotates through its 242 to 248 degree positions, the rise portion 222 of cam 217 actuates lever 223 and actuator 233 of switch 237 far enough to cause contacts, J, K and J, L to snap open and closed respectively. Preferably, this action occurs at about the 245 degree position. Further, the follower 231 descends the drop 232 on cam 219 and contacts M, N of switch 239 snap open.

The closure of J, L conditions one leg of a *circuit D* for operation of motor 95 which under normal conditions occurs at a later time. The conditioned leg of

*circuit D* extends from contact F of switch 167″ through 327, L, J, 331, 95, 335 to line 317. The other leg is from contact F, through E, 333 to line 317.

Under normal operation contacts F, E will be open so the closure of contacts J, L has no effect. However, if the shaft 99 has been returned to its initial position after motor 95 was started *circuit D* will be closed by the closure of contacts J, L so that motor 95 will be energized by *circuit D* after *circuit C* has been opened by switch 239. This insures that shaft 99 will continue rotating until contacts J, L are opened and J, K are closed, due to follower 229 descending the drop 226 of cam 217. The shaft 91 thus completes its entire cycle to its initial position, without interruption.

Under normal and proper operation however, contacts E, F, are open and closure of J, L will have no immediate effect. Since contacts J, K and M, N are both opened at the 245 degree position, the motor 95 will be deenergized and its brake will be applied to bring it to a stop. The parts will coast more than five degrees and during this movement, at about 250 degree position of shaft 91, follower 229 will ride upon the dwell 224 of the cam 217 and the plunger 245 will be fully depressed and the associated valve will be fully open.

Under normal conditions the shaft 91 will be braked to a stop somewhere between the 250 and 300 degree positions. The exact position is immaterial because no further events occur in this region.

The dispenser motor 5 continues to run and the control valve is open so that liquid will flow as soon as the nozzle valve is opened. In the case of the FIG. 14 structure, the valves 251, 253 are both opened. In the case of the FIG. 15 structure valve 59 or 260 is opened quickly and for this reason the switch actuator 264 is depressed only after both switches 237 and 239 have been actuated as described above, that is, during the coasting period of the motor 95 from the 248 to the 250 degree positions of shaft 91 and preferably at the latter position.

Liquid may now be dispensed by opening the nozzle valve and the gallons delivered and the cost thereof will be accumulated on the registers 17, 15 respectively. At the end of the delivery, the nozzle valve is closed and the lever 97 is rotated clockwise (FIG. 7) to its initial position shown in full lines.

The various events which occur during this operation of shafts 99 and 91 are diagramed in FIGS. 11 and 12 respectively. As seen in FIG. 11 the first 37 degrees of clockwise rotation of the control shaft 99 produces a similar rotation of lever 111 and should produce no rotation of cam 157 because of its lost motion connection 159, 161 with the shaft. It any case the cam can have no effective motion because if it should be dragged along by the shaft, it will be stopped by the entry of projection 163 of lever 127 in notch 173. Cam 157 will be moved upon any further rotation since the lost motion is entirely taken up with the 37 degree motion.

Cam 141 will of course rotate 37 degrees without event.

During the further rotation of 99 through 3 degrees to the 5th station at the 40 degree position (FIG. 11), the tooth 147 of cam 141 clears the end of latch pawl 149 which drops into blocking position with respect to the tooth so that the rotation of shaft 99 cannot be reversed without first rotating it at least to the 3rd station (85 degree position).

At the 47 degree position (1st station), spring 121 reaches the center of shaft 99. Upon rotation to the 51 degree position, interponent 144 is withdrawn and 245 rises, and at the 56 degree position, follower 163 of lever 127 rides down the rise 169 on cam 157 far enough to restore switches 167′, 167″, to their initial condition, opening contacts A, B; C, D; E G to deenergize motor 5 and closing contacts E, F and *circuit D* to start motor 95. If motor 95 fails to start for any reason, the motor 5 cannot be restarted because hook 236 catches on 144 and prevents rotation of 99 to the 1st position.

Spring 121 passes the center of 99 before the 1st station is reached so that if lever 97 is released, the shaft returns automatically to its initial position.

In passing through its 83.5 degree position, cam 143 acting on the lower edge of pawl 149 rotates lever 131 counterclockwise far enough to move spring 129 over the center of 137 so that it will return the lever to its FIG. 3 position. Cam 141 continues to its initial position which is determined by the engagement of the other end of lug 151 with stop 153.

It will be remembered that the motor 95 and shaft 91 had previously stopped somewhere between the 250 and 300 degree positions of FIG. 12. Upon restarting, motor 95 drives shaft 91 counterclockwise and when it reaches a displacement of from 310 to 313 degrees, the follower 229 reaches the abrupt fall 226 of cam 217 and is rotated clockwise. As a result, the valve is closed to prevent any liquid flow and the contacts J, L of switch 237 open while J, K close substantially simultaneously with the valve closure.

The opening of contacts J, L breaks the *circuit D* through motor 95, the motor brake becomes effective and the motor comes to a halt with the shaft somewhere between its 313 degree and its initial starting (360 degree) position.

It will be seen from FIG. 12 that during the first and second phases of the shaft cycle (zero to 300 degrees and 300 to 360 degrees respectively) all of the events to be performed during the respective phases have been completed before or immediately after the motor is deenergized and that approximately 50 degrees further rotation of the shaft are allowed for motor coast in each phase. Since the speed reduction from motor pinion 175 to the shaft 91 is about 195.5 to 1, this 50 degree travel is the equivalent of about 27 full revolutions of the motor armature. Since the motor is braked, the coast of shaft in actual practice would normally be substantially less than the 50 degrees allowed but this causes no malfunction since it merely requires a slightly longer time, each time the motor is restarted, to move the shaft 91 to the position required to perform the first event of the next phase. In fact the stopping of the motor short of the 300 and 360 degree positions respectively is beneficial since it provides a period of minimum load on the motor to enable it to accelerate rapidly to its normal speed.

The interlock mechanism 133 is provided to prevent the delivery of fuel without first resetting the registers. It will be seen from FIG. 11 that switch 167 is actuated to start motors 5 and 95 at about the 71 degree position of shaft 99 as it moves counterclockwise from its initial position. As shown in FIG. 11, on the clockwise (return) rotation of 99, the latch pawl 149 is forced into locking position with respect to tooth 147 at the 40 degree position. Switch 167 is returned to its initial position to stop pump motor 5 at the 56 degree returned position in FIG. 1. Thus since the shaft cannot move counterclockwise from the 41 degree position FIG. 11 to the 71 degree position which is the travel required to move switch 167 from its initial to its actuated position, because the tooth 147 strikes the end of pawl 149 at the 57 degree position, it is obvious that the handle must be rotated clockwise at least to the 83.5 degree position (FIG. 11) to clear the latch pawl. When this is done both motors 5 and 95 start when the shaft, being turned counterclockwise, reaches its 71 degree position and resetting occurs automatically. Thus it is impossible to rotate the shafts 99 and 91 counterclockwise through their respective first phases and make a delivery, then return the shaft 99 clockwise to stop the pump motor with the registers showing the last sale and somehow block the lever 97 from returning to its initial position under the action of spring 121 and thereafter move the lever 97 counterclockwise again to make another delivery without resetting the registers.

Since the cams and their corresponding levers and switches shown in FIG. 7 are all enclosed in the box 109, it is impossible to manipulate them separately without taking the structure apart.

Further, if the lever 97 is left in the dashed line position (FIG. 7) which it occupies at the ends of the first phases of the cycles or in any position between that and the 56 degree position (FIG. 11), the nozzle cannot be entered in the boot and supported on the hook. If the nozzle is not in place, this serves as adequate warning of improper manipulation.

The over centering mechanism 121, 111 also insures that lever 97 and its associated parts will move the full stroke in either direction once they have been moved a substantial distance unless they are deliberately held or wedged against movement. This mechanism also resists accidental movement of the lever and unintentional operation of the motor actuated mechanisms.

It is also to be noted that if the handle 97 is operated counterclockwise to the switch on (71 degree) position and returned to the initial position, the resetting motor 95 will continue to run because having been started by the closure of contacts E, F and *circuit B*, it will close contacts N, M (switch 239) very quickly (13½ degrees FIG. 12) which establishes the holding *circuit C* which holds the motor energized to the 245 degree position, at which contacts J, L of switch 237 are closed and contacts N, M of switch 237 are opened. Closure of J, L with contacts E, F closed, immediately establishes the second phase operating *circuit D* through motor 95 which will continue to run and will return the shaft 91 to its initial position. If any delivery of fuel has been made, it will be registered just as any other, normal delivery would be.

The result just described is attained in the same way if the shaft 91 is forceably rotated counterclockwise, with handle 97 in its initial position.

If the shaft 91 is forceably rotated clockwise, with lever 97 in its initial position, switch J, L will be closed to start the reset motor 95 via the second phase *circuit D* which will return the shaft toward its initial position as soon as the manual rotating effort is relaxed. Because of the high ratio of the motor gearing, it is virtually impossible to rotate shaft 91 by hand.

It will thus be seen that any readily effected misoperation of the control handle or even deliberate rotation of the shaft 91 cannot produce an improper delivery or registration which could cheat or favor the purchaser receiving fuel from the dispenser.

*Modified power shaft connection*

In certain styles and models of dispensers it is necessary to connect the shaft 211 with the right hand end of shaft 91 instead of the left hand end as shown in FIG. 1, that is, the shaft 91 is turned end for end relative to the shaft 211, along with the registering mechanism. If the shafts 91 and 211 were then connected, shaft 91 would be rotated in the wrong direction i.e. clockwise in FIGS. 7 and 12.

To make provision for such requirements, comparison of FIGURES 16 and 2 shows that the socket member 197 may be extended as at 337 (FIG. 16) and be provided with a gear 339 which meshes with a gear 341 mounted on a headed, shoulder pin 343 which is fixed in the cover 203. Gear 341 has a hollow hub 345 which is slotted to receive the ball and pin connector 209, 210 of shaft 211. The end of shaft 91 opposite to that shown in FIG. 2 is provided with a ball and cross-pin 347, 349, already described and as shown in FIG. 5, to enter the right hand socket and 212, 213 on the shaft 211 (FIG. 2).

Thus when the shaft 91 is driven from the left hand end as seen in FIG. 1, the shaft 211 will be driven directly by the ball and pin socket in member 197 but when it is driven from the right hand end, the shaft 211 will be inserted in and driven by the hub 345 to secure the proper directional rotation of the shaft 91.

In order to elaborate somewhat on the purpose of the interponent 144 and its associated parts, it is assumed that due to the burning out of the motor 95 or for some reason, the power shaft 91 is stopped in a position in which the plunger 245 is depressed, the associated valve 59 or 260 is open and the motor 5 remains operative.

In such a situation if a delivery were made in the normal maner, and the control shaft 99 were returned to its initial position, the motor 5 would be deenergized. However, the resetting motor, being disabled, would not complete the cycle of power shaft 91. Consequently, the handle 97 and shaft 99 could subsequently be rotated forward to close switches 167', 167", the motor 5 would start and since the valve is open, a delivery could be made without resetting the registers.

Such undesirable operation is prevented by the interponent and the hook 236 because, whenever the lever 97 and shaft 99 are rotated from the final position toward the initial position 51 degrees, the cam 142 withdraws the thick portion 148 of the interponent from contact with land 234 of lever 223, FIG. 9A and the plunger 245 will rise under the action of a spring, tilting the interponent upwardly so that upon a subsequent movement thereof toward the plunger, with the hook 236 held in the position which it occupies in any valve open position, the interponent will engage the hook and will prevent the insertion of the thick part 148 between the land 234 and the plunger. The plunger therefore remains in its upper, valve closed, position. Thus even though switch 167' were closed somehow, no delivery could be made.

Switch 167' cannot be closed however, since the hook 236 engages the notched end of the interponent when the shaft 99 is rotated forward 48 degrees (FIG. 11). The rotation of the shaft beyond the 48 degree position to the 1st station (71 degree position) necessary to close switch 167' is thus positively prevented.

*Modified operation of switch 167'*

It is obvious that it is not necessary to have the pump motor 5 energized before the valve 59 or 260 is opened because, when a valve is employed, no delivery can be made until the valve is opened.

Accordingly, instead of closing the switch 167' by means of cam 157 and actuator 166, this switch may be operated by the plunger 245 as shown in FIGURE 10 or otherwise, substantially simultaneously therewith.

In this structure the same switch 167' is used and a mechanism is provided for closing the switch contacts A, B and C, D upon downward motion of the plunger from its initial position and opening them upon the upward movement of the plunger. A simple form of such mechanism for operating the switch comprises merely an arm or projection 246 which is attached to the plunger 245 and which extends toward the actuating button 248 of the switch.

In this form of the apparatus, the valve opening and closing events will occur in the same manner and at the times shown in FIG. 12 and the switch 167' will close and open respectively at substantially the same times so that the motor 5 will be energized and the valve will be open at the end of the first phase of the cycle of shaft 91 and 5 will be deenergized and the valve will be closed before the end of the second phase of the shaft cycle.

Figure 13:
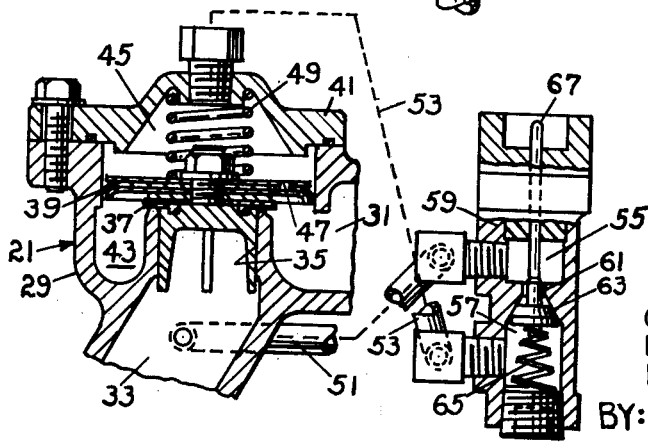
FIGURE 13 is a sectional view of a hydraulic dispensing control valve and its pilot valve.

Obviously, either valve 59 (with its control valve 21) or the valve 260 may be operated directly by the plunger as shown in FIGS. 2, 13 and 14 or by the switch 265 and solenoid 269 as shown in FIG. 15.

A valve and a pump motor switch 167' are both required if one pump 7 and motor 5 are used to supply several dispensers, as in a submerged pumping system or other remote pumping systems which are in common use, or if the pump motor used in a dispenser as shown in FIG. 1 is started before resetting of the registers is completed.

However, in motor pump dispenser such as that shown in FIG. 1, in which the pump motor is started only after the resetting of the registers is completed, that is, in a dispenser employing the mechanism of FIG. 10, the valve 59 or 260 may be eliminated entirely.

*Remote registration modification*

In some installations it is desired to locate the variator 13 and registers 15 and 17 at some distance from the dispensing hose, the actuating lever 97, shaft 99 and the mechanisms associated therewith. The meter 9 may be located either with the registers or with the dispensing hose and, in the latter case, a remote driving system of any of a number of known kinds can be used to connect the meter to drive the variator.

It will be seen from FIG. 7 that all of the connections between the mechanisms associated with the shafts 91 and 99 are electrical except the interponent 144. Thus, while these shafts and their respective mechanisms are shown incorporated in a single box, each can be placed in a separate box and the box containing shaft 99 can be installed at the dispensing point while that containing shaft 91 may be installed with the registers.

In order to provide for the operation of the interponent, which co-acts with the hook 236 and plunger 245 operated by shaft 91 and which is controlled by shaft 99, a solenoid 152 (FIG. 9B) is mounted adjacent shaft 91 and has an armature 154 which is withdrawn from the solenoid by a spring 156. The interponent 144' which has a thick part 143' and is notched at 150', is pivotally attached at 158 to the end of armature 154.

As shown in FIG. 7, the solenoid 152 has one end connected to contact G of switch 167" and the other to main 317.

As previously explained, the interponent 144' rests on the plunger 245 at all times but it is held in its withdrawn position by spring 156, as shown by solid lines in FIG. 9B, whenever switch contacts E, G are open. When these contacts are closed, the solenoid is energized to overcome spring 156 and to move the interponent so that the thick part thereof is interposed between the land 234 and the plunger 245 so that, upon subsequent rotation of shaft 91 and lever 223, the plunger 245 and its associated valve and/or switch will be actuated to the dashed line position (FIG. 9B).

In the vent that shaft 99 should be reversely rotated to the 1st station FIG. 11, at which contacts E, G are opened, the interponent 144' will be withdrawn to its full line position (FIG. 9B) and if such an event occurs while the lever 223 is in its dashed line position in this view, the hook 236, which is engaged in notch 150' will prevent forward rotation of shaft 91 to the 2nd station and the switches A to D, and E, G are prevented from reclosing until the defect preventing the operation of motor 95 through the second phase of its cycle is rectified.

It is obvious that various changes may be made in the form, structure and arrangement of parts of the specific embodiments of the invention disclosed herein for purposes of illustration, without departing from the spirit of the invention. Accordingly, applicants do not desire to be limited to such specific embodiments but desire protection falling fairly within the scope of the appended claims.

We claim:

1. A power resetting mechanism for a resettable register having a number of movable, different order indicators, means including a first shaft and first clutch means for moving said indicators from zero indicating positions to register the rotation of said shaft and means including a second shaft and second clutch means for moving said indicators to their zero indicating positions and clutch shifting means movable between a first position in which said first and second clutch means are effective and ineffective respectively and a second position in which said first and second clutch means are ineffective and effective respectively, said resetting mechanism comprising
   (a) a power shaft, an electric motor connected to actuate said power shaft,
   (b) control means movable from an initial to a first position, means including a first switch which is closed in response to said movement for energizing said motor,
   (c) means operable by said power shaft to move said clutch shifting means from said first to said second position, to pause and thereafter to return said shifting means to said first position,
   (d) resetting means connected to drive said second shaft to move said indicators to zero indicating position,
   (e) means for connecting said power shaft to drive said resetting means after the beginning of said pause and for disconnecting said power shaft and resetting means prior to the end of said pause,
   (f) means including a second switch actuated from closed to open position by said power shaft for de-energizing said motor after said shifting means is returned to said first position, to cause said power shaft to stop,
   (g) an additional switch for controlling a pump motor to energize and deenergize the same, said additional switch being actuated to pump-motor-energizing condition by said power shaft after said shifting means is returned to said first position and before said power shaft stops,
   (h) and means operable in response to movement of said control means from its first position to its initial position for opening said first switch and closing said second switch to condition the resetting mechanism for a new cycle.

2. A power resetting mechanism for a resettable register having a number of movable, different order indicators, means including a first shaft and first clutch means for moving said indicators from zero indicating positions to register the rotation of said shaft and means including a second shaft and second clutch means for moving said indicators to their zero indicating positions and clutch shifting means movable between a first position in which said first and second clutch means are effective and ineffective respectively and a second position in which said first and second clutch means are ineffective and effective respectively, said resetting mechanism comprising:
   (a) a power shaft, an electric motor connected to actuate said power shaft,
   (b) control means movable from an initial to a first position, means responsive to said movement for energizing said motor,
   (c) means operable by said power shaft to move said clutch shifting means from said first to said second position, to pause and thereafter to return said shifting means to said first position,
   (d) resetting means connected to drive said second shaft to move said indicators to zero indicating position,
   (e) means for connecting said power shaft to drive said resetting means after the beginning of said pause and for disconnecting said power shaft and resetting means prior to the end of said pause,
   (f) means operable by said power shaft for deenergizing said motor after said shifting means is returned to said first position, to cause said power shaft to stop,
   (g) a control device having an initial and an actuated condition, and actuable to said respective conditions,
   (h) actuating means operable by said power shaft for establishing said control device in its actuated condition after said shifting means is returned to said first position and before said power shaft stops,
   (i) means responsive to the movement of said control means to its initial position for reenergizing said motor to cause further movement of said power shaft, said actuating means thereupon serving to restore said control device to its initial condition, (j) and means responsive to such further movement of said power shaft for again deenergizing said motor.

3. The structure defined by claim 2 which includes
(a) a second electric motor, means for energizing said second motor and for holding it energized while said control device is established in its actuated condition and
(b) means for deenergizing said second motor substantially contemporaneously with the restoration of said control device to its initial condition.

4. The structure defined by claim 3 wherein said means for deenergizing said second motor is operable in response to the movement of said control means toward its initial position.

5. The structure defined by claim 3 wherein said means for energizing and deenergizing said second motor comprises
(a) a switch connected in circuit with said second motor,
(b) means operable by said control means upon movement thereof from its initial toward its first position for closing said switch and operable by said control means upon movement thereof from its first position toward its initial position for opening said switch.

6. A power resetting mechanism for a resettable register having a number of movable, different order indicators, means including a first shaft and first clutch means for moving said indicators from zero indicating positions to register the rotations of said shaft and means including a second shaft and second clutch means for moving said indicators to their zero indicating positions and clutch shifting means movable between a first position in which said first and second clutch means are effective and ineffective respectively and a second position in which said first and second clutch means are ineffective and effective respectively, said resetting mechanism comprising
(a) a power shaft, an electric motor connected to actuate said power shaft,
(b) a manually operable control shaft mounted for rotation in opposite directions between initial and final positions,
(c) a circuit, comprising a normally closed 1st switch connected to one power main and in series with a normally open 2nd switch and said motor, means connecting said motor to another power main,
(d) a circuit, comprising a normally open 3rd switch connected in series with a normally closed 4th switch, said switches being connected in parallel across said 1st and 2nd switches,
(e) a circuit, comprising a normally open 5th switch also connected in parallel with said 1st and 2nd switches,
(f) means responsive to the operation of said control shaft from its initial position toward its final position for opening said 1st switch and closing said 3rd switch to energize said motor,
(g) means responsive to the initial rotation of said power shaft for closing said 5th switch to hold said motor energized,
(h) means operable by said power shaft to move said clutch shifting means from said first to said second position, to pause and thereafter to return said shifting means to said first position,
(i) resetting means connected to drive said second shaft to move said indicators to zero indicating position,
(j) means for connecting said power shaft to drive said resetting means after the beginning of said pause and for disconnecting said power shaft from said resetting means prior to the end of said pause,
(k) and means operable by said power shaft for closing said 2nd switch and opening said 4th and 5th switches, after said shifting means is returned to said first position, to deenergize said motor and initiate stopping of said power shaft.

7. The structure defined by claim 6 which includes means responsive to rotation of said control shaft from its final toward its initial position to reopen the 3rd switch and reclose the 1st switch, said 1st switch serving to reenergize said motor when said 2nd switch is closed.

8. The structure defined by claim 7 which includes means operable by said power shaft to open the 2nd switch and close the 4th switch, subsequent to the reenergization of said motor by said 1st and 2nd switches, to deenergize said motor.

9. The structure defined by claim 7 which includes
(a) a control device having an initial and an actuated condition, and actuable to said respective conditions,
(b) actuating means operable by said power shaft for establishing said device in its actuated condition after said shifting means is returned to said first position and before said power shaft stops and means for returning said device to its initial condition upon reenergization of said motor.

10. The structure defined by claim 9 wherein said control device comprises a switch, and a second motor controlled by the switch.

11. The structure defined by claim 9 wherein said control device comprises a valve.

12. The structure defined by claim 7 which includes a second motor, a 6th switch normally open switch for supplying power to said second motor and means for closing and opening said 6th switch substantially simultaneously with said 3rd switch.

13. The structure defined by claim 6 which includes resilient over-centering means connected with said control shaft, said over-centering means being constructed so that when the control shaft reaches a point of rotation in one direction, intermeditae its initial and final positions, said over-centering means is rendered effective to complete the rotation of said shaft in the same direction.

14. The structure defined by claim 6 which includes stop means coacting with said control shaft to prevent rotation thereof beyond its initial and final positions.

15. A power resetting mechanism for a resettable register having a number of movable, different order indicators, means including a first shaft and first clutch means for moving said indicators from zero indicating positions to register the rotations of said shaft and means including a second shaft and second clutch means for moving said indicators to their zero indicating positions and clutch shifting means movable between a first position in which said first and second clutch means are effective and ineffective respectively and a second position in which said first and second clutch means are ineffective and effective respectively, said resetting mechanism comprising
(a) a power shaft, an electric motor connected to actuate said power shaft,
(b) a manually operable control shaft mounted for forward rotation from an initial to a final position, thereby passing successively through a number of stations and passing reversely through said stations upon reverse rotation from said final to said initial positions,
(c) a normally closed 1st switch connected to one power main and in series with a normally open 2nd switch and said motor, means connecting said motor to another power main,
(d) a normally 3rd switch connected in series with a normally closed 4th switch, said 3rd and 4th switches being connected in parallel across said 1st and 2nd switches,
(e) a normally open 5th switch also connected in parallel with said 1st and 2nd switches, (f) a switch actuator element rotatably mounted on said control shaft and adapted to control said 1st and 3rd switches, (g) a lost motion device for connecting said control shaft to rotate said actuator element after a predetermined rotation of said shaft from its initial and final positions respectively, (h) said actuator being responsive to the forward rotation of said control shaft through a 1st station to a 2nd station for opening said 1st switch and closing said 3rd switch to energize said motor, (i) means responsive to the initial rotation of said power shaft for closing said 5th switch to hold said motor energized, (j) means operable by said power shaft to move said clutch shifting means from said first to said second position, to pause and thereafter to return said shifting means to said first position, (k) resetting means connected to drive said second shaft to move said indicators to zero indicating position, (l) means for connecting said power shaft to drive said resetting means after the beginning of said pause and for disconnecting said power shaft from said resetting means prior to the end of said pause, (m) means operable by said power shaft for closing said 2nd switch and opening said 4th and 5th switches after said shifting means is returned to said first position, to deenergize said motor and initiate stopping of said power shaft, (n) means, including said lost motion device and actuator element for opening said 3rd switch and closing said 1st switch when said control shaft is reversely rotated to its 1st station, (o) and interlocking means having an effective condition for preventing subsequent forward rotation of said control shaft directly from said 1st station to said 2nd station.

16. The structure defined by claim 15 which includes means responsive to reverse rotation of said control from said 1st station to a 3rd station for rendering said interlocking means ineffective to prevent the next subsequent forward rotation of said shaft to said final position.

17. The structure defined by claim 16 which includes means responsive to the forward rotation of said control shaft from said 3rd station through said 1st station to a 4th station, intermediate said 1st and 2nd stations, for conditioning said interlocking mechanism for movement to its effective condition, said mechanism in its conditioned state being unable to prevent continued forward rotation of said shaft through said 2nd station to said final position.

18. The structure defined by claim 16 in which said interlock is constructed to move into effective condition upon reverse rotation of said control shaft from said 2nd station through said 4th station to a 5th station disposed intermediate said 1st and 4th stations.

19. A power resetting mechanism for a resettable register having a number of movable, different order indicators, means including a first shaft and first clutch means for moving said indicators from zero indicating positions to register the rotations of said shaft and means including a second shaft and second clutch means for moving said indicators to their zero indicating positions and clutch shifting means movable between a first position in which said first and second clutch means are effective and ineffective respectively and a second position in which said first and second clutch means are ineffective and effective respectively, said resetting mechanism comprising (a) a power shaft, an electric motor connected to actuate said power shaft (b) a manually operable control shaft mounted for forward rotation from an initial to a final position, thereby passing successively through a number of stations and passing reversely through said stations upon reverse rotation from said final to said initial positions, (c) a normally closed 1st switch connected to one power main and in series with a normally open 2nd switch and said motor, means connecting said motor to another power main, (d) a normally open 3rd switch connected in series with a normally closed 4th switch, said 3rd and 4th switches being connected in parallel across said 1st and 2nd switches, (e) a normally open 5th switch also connected in parallel with said 1st and 2nd switches, (f) a switch actuator element rotatably mounted on said control shaft and adapted to control said 1st and 3rd switches, (g) a lost motion device for connecting said control shaft to rotate said actuator element after a predetermined rotation of said shaft from its initial and final positions respectively, (h) said actuator being responsive to the forward rotation of said control shaft through a 1st station to a 2nd station for opening said 1st switch and closing said 3rd switch to energize said motor, (i) means responsive to the initial rotation of said power shaft for closing said 5th switch to hold said motor energized, (j) means operable by said power shaft to move said clutch shifting means from said first to said second position, to pause and thereafter to return said shifting means to said first position, (k) resetting means connected to drive said second shaft to move said indcators to zero indicating position, (l) means for connecting said power shaft to drive said resetting means after the beginning of said pause and for disconnecting said power shaft from said resetting means prior to the end of said pause, (m) means operable by said power shaft for closing said 2nd switch and opening said 4th and 5th switches after said shifting means is returned to said first position, to deenergize said motor and initiate stopping of said power shaft, (n) and means, including said lost motion device and said actuator element for opening said 3rd switch and closing said 1st switch when said control shaft is reversely rotated to its 1st station.

20. The structure defined by claim 19 which includes an additional switch, a second motor connected to be controlled by said additional switch, said additional switch being disposed for operation by the actuator for said 1st and 3rd switches to close and open substantially simultaneously with said 3rd switch.

21. The structure defined by claim 19 which includes (a) a pump connected to be driven by said second motor, (b) a meter, comprising a part of said means for driving said first shaft, connected to receive fluid from said pump, (c) a normally closed valve communicating with said pump and meter, and means operable by said power shaft for opening said valve after the return of said shifting means to said first position, said last named means acting to hold said valve open while said shaft is stopped.

22. The structure defined by claim 15 which includes an additional switch, a second motor connected to be controlled by said additional switch, and means operable by said power shaft for closing said additional switch in the period after said shifting means are returned to said first position and before said power shaft stops.

23. The structure defined by claim 22 which includes means responsive to the closure to the 1st switch, upon reverse rotation of the control shaft, for restarting said power shaft, to open said additional switch.

24. The structure defined by claim 22 which includes
(a) a pump connected to be driven by said second motor,
(b) a delivery line connected with said pump,
(c) a meter in said delivery line and connected to drive said first shaft,
(d) a valve connected to control the flow through said delivery line,
(e) and means operable by said power shaft for opening said valve within said period.

25. The structure defined by claim 24 wherein said valve comprises a small and a large poppet and wherein said valve opening means first opens said small poppet and thereafter said large poppet.

26. The structure defined by claim 24 wherein said valve opening means comprises a normally open switch, an electric motor connected to be controlled by said switch and connected to operate said valve.

27. The structure defined by claim 24 wherein said valve includes a fluid operated motor for operating it, means connecting said fluid operated motor with said delivery line for operation in response to fluid pressure in said line, and a normally closed pilot valve connected in communication with said fluid operated motor for controlling the operation thereof, said pilot valve being disposed for operation by said valve opening means.

28. The structure defined by claim 24 which includes means responsive to the closure of said first switch, upon reverse rotation of said control shaft for restarting said power shaft to open said additional switch and to close said valve.

29. A power resetting mechanism for a resettable register having a number of movable, different order indicators, means including a first shaft and first clutch means for moving said indicators from zero indicating positions to register the rotation of said shaft and means including a second shaft and second clutch means for moving said indicators to their zero indicating positions and clutch shifting means movable between a first position in which said first and second clutch means are effective and ineffective respectively and a second position in which said first and second clutch means are ineffective and effective respectively, said resetting mechanism comprising
(a) a power shaft, an electric motor connected to actuate said power shaft,
(b) control means movable from an initial to a first position, means responsive to said movement for energizing said motor,
(c) means operable by said power shaft to move said clutch shifting means from said first to said second position, to pause and thereafter to return said shifting means to said first position,
(d) resetting means connected to drive said second shaft to move said indicators to zero indicating position,
(e) means for connecting said power shaft to drive said resetting means after the beginning of said pause and for disconnecting said power shaft and resetting means prior to the end of said pause,
(f) means operable by said power shaft for deenergizing said motor after said shifting means is returned to said first position, to cause said power shaft to stop,
(g) a control device having an initial and an actuated condition, and actuable to said respective conditions,
(h) actuating means operable by said power shaft for establishing said control device in its actuated condition after said shifting means is returned to said first position and before said power shaft stops,
(i) an interponent disposed between said actuating means and said control device, said interponent having a first position in which it coacts with said actuating means to establish said control device in its actuated condition and a second position in which it will permit said control device to occupy its initial condition,
(j) and means responsive to movement of said control means from initial position to said first position, for moving said interponent to its first position and responsive to reverse movement of said control means from said first position for moving said interponent to its second position.

30. A power resetting mechanism for a resettable register having a number of movable, different order indicators, means including a first shaft and first clutch means for moving said indicators from zero indicating positions to register the rotation of said shaft and means including a second shaft and second clutch means for moving said indicators to their zero indicating positions and clutch shifting means movable between a first position in which said first and second clutch means are effective and ineffective respectively and a second position in which said first and second clutch means are ineffective and effective respectively, said resetting mechanism comprising:
(a) a power shaft, an electric motor connected to actuate said power shaft,
(b) control means movable from an initial to a first position, means responsive to said movement for energizing said motor,
(c) means operable by said power shaft to move said clutch shifting means from said first to said second position, to pause and thereafter to return said shifting means to said first position,
(d) resetting means connected to drive said second shaft to move said indicators to zero indicating position,
(e) means for connecting said power shaft to drive said resetting means after the beginning of said pause and for disconnecting said power shaft and resetting means prior to the end of said pause,
(f) means operable by said power shaft for deenergizing said motor after said shifting means is returned to said first position, to cause said power shaft to stop,
(g) a control valve having an initial closed condition and an actuated open condition, and actuable to said respective conditions,
(h) actuating means operable by said power shaft for establishing said control valve in its actuated open position after said shifting means is returned to said first position and before said power shaft stops,
(i) and means responsive to the movement of said control means to its initial position for restoring said control valve to its initial condition and for conditioning said reset mechanism for a new cycle.

31. The structure defined in claim 30 in which said last named means includes means for reenergizing said motor to cause further movement of said power shaft, said actuating means thereupon serving to restore said control device to its initial condition, and means responsive to such further movement of the power shaft for again deenergizing said motor.

32. A power resetting mechanism for a register which is advanced in response to a controlled operation such as fuel dispensing flow and the like and is resettable by rotation of a power shaft through a resetting cycle, comprising
(a) a power shaft, an electric motor connected for actuating said shaft,
(b) control means movable from an initial to a first position,
(c) means, including a switch responsive to said movement, for energizing said motor and thereby driving said power shaft through a register-resetting cycle and thereafter deenergizing said motor to cause the power shaft to stop,
(d) a control device for controlling the operation to which the register is responsive and actuable between an initial condition in which it prevents such operation and an actuated condition in which such operation may occur,
(e) actuating means operable by said power shaft for establishing said control device in its actuated condition after said register-resetting cycle and before said power shaft stops,
(f) an interponent having a first position in which it coacts with said actuating means to maintain said control device in its actuated condition and a second position in which it releases said control device to its initial condition,
(g) and means responsive to movement of said control means from initial position to said first position for disposing said interponent in its first position and responsive to movement of said control means away from its said first position for moving said interponent to its second position.

33. The structure defined by claim 32, which includes cam means operable by movement of said control means toward its initial position to open said switch and to positively move said interponent to its second position, and operable by reverse movement of said control means to close said switch and to dispose said interponent for said coaction with said actuating means.

34. The structure defined in claim 32 in which said actuating means includes an element which is moved by said power shaft through a predetermined path, and said interponent in its first position is engaged by said element to transmit movement for actuating said control device and in its second position is withdrawn from said path.

35. The structure defined by claim 30 which includes
 (a) a pump, a meter comprising a part of said means to drive said first shaft, and means defining a fluid conduit connecting said pump, meter and valve,
 (b) a second electric motor connected to drive said pump, an additional switch for energizing said motor and holding it energized while said valve is open and
 (c) means for opening said switch substantially contemporaneously with the closing of said valve.

36. The structure defined by claim 31 which includes a second motor, said device including a switch for said second motor disposed to be closed when said device is in said actuated condition and to open when said device is in its initial condition.

37. The structure defined by claim 36 in which said device includes a valve disposed to be opened and closed substantially as said switch is closed and opened.

38. The structure defined by claim 31 in which said device includes a valve disposed to be opened when said device is in its actuated condition and to be closed when said device is in its initial condition.

39. The structure defined by claim 31 which includes means for preventing movement of said control means to its first position when said actuating means for said device occupies the position for moving said device to its actuated condition.

40. The structure defined by claim 31 wherein the means for moving said interponent to and from its respective positions includes a mechanism connecting said control means with said interponent.

41. The structure defined by claim 40 which includes a cam operable by said control means and a follower for said cam connected with said interponent.

42. The structure defined by claim 31 wherein the means for moving said interponent to and from its respective positions includes means including an electric motor connected to operate said interponent and connected to be energized and deenergized in response to the operation of said control means.

43. The structure defined by claim 42 wherein said electric motor is a solenoid having an armature connected to said interponent, means for urging said armature to move said interponent toward its second position, said solenoid acting, when energized, to move said interponent toward its first position and a switch connected for operation by said control means and connected to energize and deenergize said solenoid.

44. The structure defined by claim 42 wherein said control means are disposed in one location and said register, control device, interponent and the power shaft and its motor are disposed in a location remote from said one location.

45. The structure defined by claim 44 in which said control device includes a switch adapted to be closed and opened as said device is moved to and from its actuated condition, a valve, a solenoid connected to operate said valve and means connecting said last named switch to energize and deenergize said valve.

References Cited by the Examiner

UNITED STATES PATENTS

| | | | |
|---|---|---|---|
| 1,692,489 | 11/28 | Dinsmore | 235—139.1 |
| 2,928,572 | 3/60 | Markojf, et al. | 222—35 |
| 2,932,448 | 4/60 | Bliss | 235—144 |
| 3,142,442 | 7/64 | Wild | 235—144 |

LEO SMILOW, *Primary Examiner.*